United States Patent
Hofmann et al.

(10) Patent No.: US 10,421,836 B2
(45) Date of Patent: Sep. 24, 2019

(54) PROCESS FOR PURIFYING POLYCARBONATE POLYOLS AND PURIFYING APPARATUS THEREFOR

(71) Applicant: Covestro Deutschland AG, Leverkusen (DE)

(72) Inventors: Jörg Hofmann, Krefeld (DE); Stefanie Braun, Köln (DE); Kai Laemmerhold, Aachen (DE); Matthias Wohak, Dormagen (DE); Cyrus Ahmadzade-Youssefi, Köln (DE); Jürgen Bausa, Kürten (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 146 days.

(21) Appl. No.: 15/323,704

(22) PCT Filed: Jun. 29, 2015

(86) PCT No.: PCT/EP2015/064733
§ 371 (c)(1),
(2) Date: Jan. 3, 2017

(87) PCT Pub. No.: WO2016/001164
PCT Pub. Date: Jan. 7, 2016

(65) Prior Publication Data
US 2017/0152345 A1    Jun. 1, 2017

(30) Foreign Application Priority Data

Jul. 3, 2014 (EP) ..................................... 14175603

(51) Int. Cl.
*C08G 64/40* (2006.01)
*C08G 64/34* (2006.01)
(Continued)

(52) U.S. Cl.
CPC ............. *C08G 64/406* (2013.01); *B01D 1/06* (2013.01); *B01D 3/148* (2013.01); *B01D 3/26* (2013.01); *B01D 3/346* (2013.01); *C08G 64/34* (2013.01)

(58) Field of Classification Search
CPC . B01D 1/06; B01D 3/26; B01D 3/148; B01D 3/346; C08G 64/34; C08G 64/406
See application file for complete search history.

(56) References Cited

U.S. PATENT DOCUMENTS 3,210,271 A * 10/1965 Byerly ................... B01D 3/143
202/154
4,134,795 A * 1/1979 Howat, III ................ C07C 7/08
203/53
(Continued)

FOREIGN PATENT DOCUMENTS

EP       2703426 A1    6/2013
EP       2703426 A1 *  3/2014  ............. C08G 64/34
WO    WO 2008/092767 A1  8/2008

OTHER PUBLICATIONS

EP2703426A1_ENG (Espacenet machine translation of Mueller) (Year: 2014).*

(Continued)

Primary Examiner — Youngsul Jeong
Assistant Examiner — Gabriel E Gitman
(74) Attorney, Agent, or Firm — K&L Gates LLP

(57) ABSTRACT

The present invention relates to a purifying apparatus for polycarbonate polyols, especially for removal of cyclic alkylene carbonates, comprising an evaporation unit (1) provided with a heater (10) and having an inlet (6) disposed at the top end thereof and a bottoms vessel (11), and a stripping column (2) connected downstream of the evaporation unit (1) and having a top (21) and a bottom (23), wherein a feed (5) for the polycarbonate polyol to be purified
(Continued)

opens into the inlet (6) to the evaporation unit (1) and a gas outlet line (12) and a connecting line which opens into the top (21) of the stripping column (2) and is equipped with a pump (18) depart from the evaporation unit (1), and wherein a gas inlet line (24) for an inert gas opens into the bottom (23) of the stripping column (2) and a product line (27) for the purified polycarbonate polyol departs from the bottom (23) of the stripping column (2) and a gas outlet line (25) departs from the top (21) of the stripping column (2). The invention additionally relates to a process for purifying polycarbonate polyols with such a purifying apparatus.

6 Claims, 1 Drawing Sheet

(51) Int. Cl.
*B01D 1/06* (2006.01)
*B01D 3/14* (2006.01)
*B01D 3/26* (2006.01)
*B01D 3/34* (2006.01)

(56) References Cited

U.S. PATENT DOCUMENTS

| | | | | |
|---|---|---|---|---|
| 4,826,953 | A * | 5/1989 | Kuyper | C08G 18/44 528/371 |
| 4,883,906 | A * | 11/1989 | Argyropoulos | C07C 67/44 560/238 |
| 6,060,627 | A * | 5/2000 | Valbert | C07C 41/42 536/18.6 |
| 7,414,159 | B2 * | 8/2008 | Stroefer | B01D 1/225 568/621 |
| 2010/0048935 | A1 * | 2/2010 | Mijolovic | C08G 64/0208 558/276 |
| 2012/0279082 | A1 * | 11/2012 | Seavey | B01D 3/143 34/505 |
| 2015/0259475 | A1 | 9/2015 | Müller et al. | |

OTHER PUBLICATIONS

International Search Report and Written Opinion for International Application No. PCT/EP2015/064733, European Patent Office, dated Sep. 14, 2015.

* cited by examiner

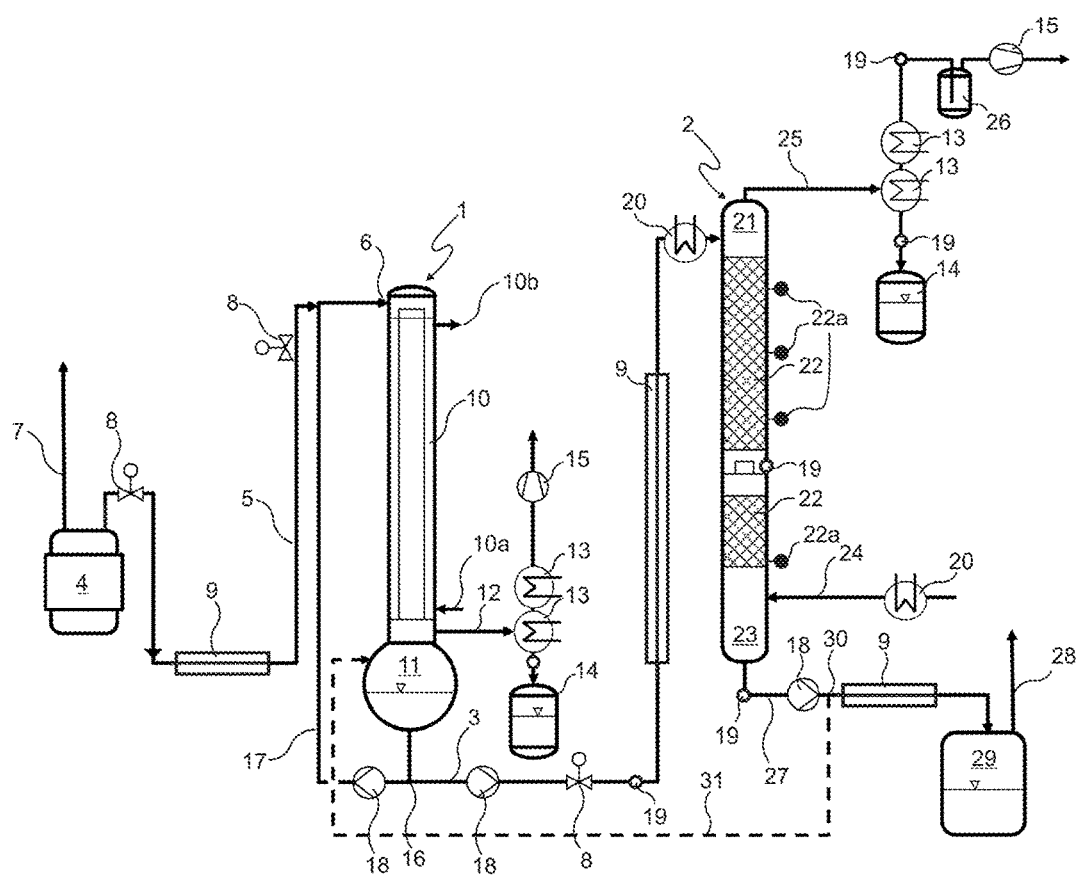

PROCESS FOR PURIFYING POLYCARBONATE POLYOLS AND PURIFYING APPARATUS THEREFOR

CROSS-REFERENCE TO RELATED APPLICATIONS

This application is a U.S. national stage application, filed under 35 U.S.C. § 371, of PCT/EP2015/064733, which was filed on Jun. 29, 2015, and which claims priority to European Patent Application No. EP 14175603.1, filed Jul. 3, 2014, the contents of each of which are incorporated by reference into this specification.

FIELD

The present invention relates to a purifying apparatus for polycarbonate polyols, especially for removal of cyclic alkylene carbonates, and to a process for operating such an apparatus.

BACKGROUND

Polycarbonate polyols have enjoyed increasing popularity in the last few years. For instance, these compounds can be used at least to some degree in place of polyether polyols, especially in the production of polyurethane foams, especially flexible foams. Carbon dioxide is used as a comonomer in polycarbonate polyols. It is not just less expensive than the alkylene oxides typically used for polyether polyols, such as ethylene oxide or propylene oxide, which are usually of petrochemical origin; in addition, through the incorporation of carbon dioxide into the polymer, a greenhouse gas is simultaneously used, which is of interest from an environmental point of view.

Processes for preparing polycarbonate polyols are known in principle. These are generally produced from alkylene oxide and carbon dioxide proceeding from a starter substance with use of suitable catalysts. A distinction is made essentially between two preparation processes. In the first variant, alkylene oxide units and the carbon dioxide used as comonomer are built up in a very substantially alternating manner to form a polymer chain. The starting use for this reaction may be a short-chain polyol, especially a diol, for example ethylene glycol. Such a preparation process is known, for example, from WO 2010/028362 A1.

Another preparation process is known, for example, from WO 2008/092767 A1. In this known preparation process, a polymer is likewise formed proceeding from a short-chain starter, such as ethylene glycol or glycerol, with use of what are called double metal cyanide catalysts (DMC catalysts), and additionally has ether moieties in the polymer chain as well as the carbonate groups formed from alkylene oxide and carbon dioxide. This is achieved by virtue of the ability of DMC catalysts to catalyze not just the reaction of alkylene oxide with carbon dioxide but equally ether formation through reaction of two alkylene oxides with one another. In this way, it is possible to adjust the profile of properties of the polymers obtained with considerably greater flexibility.

In the aforementioned preparation processes, however, as well as the actual polymer chain formation, there are typically unwanted side reactions that lead to products of low molecular weight. For instance, reaction of one alkylene oxide molecule with one carbon dioxide molecule can result in formation of cyclic alkylene carbonates, and in the formation of propylene carbonate, for example, when propylene oxide is used. The formation is shown in the following formula (I) (for example with R=CH$_3$ propylene carbonate):

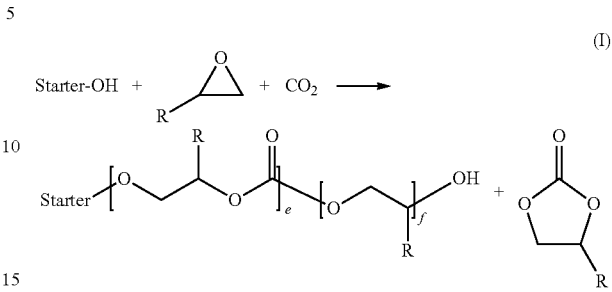

Since the presence of these compounds in the end product is generally undesirable, the reaction in the polymerization is conducted under conditions under which a minimum amount of cyclic alkylene carbonate forms. This can be achieved in a manner known per se by observing particular reaction temperatures. This is described, for example, in WO 2008/092767, where 80-130° C. is specified as the preferred reaction temperature. Nevertheless, it is not possible even by these measures to entirely suppress formation of cyclic alkylene carbonates. For example, polyether carbonate polyols prepared by means of DMC catalysis have a proportion of 3% to 15% by weight of cyclic alkylene carbonate. The proportion of cyclic alkylene carbonates present in the polycarbonate polyols has to date been reduced to a content of below 1% by separation processes after the preparation.

WO 2008/092767 describes the removal of cyclic propylene carbonate (cPC) by means of vacuum stripping at 150° C. (3 hours), giving residual cPC contents of <200 ppm in the end product. There is additional description of the removal of cPC by means of thin-film evaporators or falling-film evaporators under high vacuum (pressure <1 mbar) at 120° C. (see BMS 11 1 160-EP; application no. 12181907.7). Residual cPC contents are unspecified here.

SUMMARY

It was thus an object of the present invention to provide an improved process for purifying polycarbonate polyols which can be operated with reduced apparatus construction and at the same time enables high purifying performance, especially with regard to the removal of cyclic alkylene carbonates. In addition, a corresponding purifying apparatus is to be provided, with which this process can be conducted.

The object is achieved by a purifying apparatus for polycarbonate polyols, especially for removal of cyclic alkylene carbonates, comprising an evaporation unit provided with a heater and having an inlet arranged at the top end thereof and having a bottoms vessel, and a stripping column which is connected to the evaporation unit in the downstream direction and has a top and a bottom, wherein a feed for the polycarbonate polyol to be purified opens into the inlet of the evaporation unit, and a gas outlet line and a connecting line which opens into the top of the stripping column and has been equipped with a pump depart from the evaporation unit, and wherein a gas inlet line for an inert gas opens into the bottoms vessel of the stripping column, and a product line for the purified polycarbonate polyol departs from the bottoms vessel of the stripping column and a gas outlet line from the top of the stripping column.

BRIEF DESCRIPTION OF THE DRAWINGS

The present invention is elucidated in detail hereinafter with reference to a FIGURE and working examples. The FIGURE shows:

FIG. 1: Shows a schematic construction of a purifying apparatus of the invention.

DETAILED DESCRIPTION

In the context of the present invention, the term "polycarbonate polyols" is understood as an umbrella term but also includes polycarbonate polyols that do not have a purely alternating structure but also have ether units. Such polycarbonate polyols are also referred to as "polyether carbonate polyols". The origin of the polycarbonate polyol to be purified is unimportant for the purifying process of the invention. The polycarbonate polyol may be a strictly alternating polycarbonate polyol, a polyether carbonate polyol, or polycarbonate polyols based, for example, on a low molecular weight starter, for example glycerol, or a starter of higher molecular weight, such as PEG 800 or other starters of relatively high molecular weight.

The invention is based on the finding that it is possible with the aid of a two-stage process in which the first stage is formed by an evaporation unit and the second stage by a stripping column, under operating conditions that are comparatively simple to implement, such as pressure and temperature, to remove a majority of the impurities present, especially the cyclic alkylene carbonates present.

For example, the evaporation unit can be operated at a pressure of 100 mbar or lower, preferably at 5 to 100 mbar, more preferably at 50 mbar or lower, further preferably at 25 mbar or lower, especially preferably at 10 mbar or lower, with heating of the crude product supplied to a temperature of, for example, 120 to 180° C., preferably about 160° C. In this way, a portion of the volatile compounds, which include the cyclic alkylene carbonates among others, is already removed by evaporation, and these can then be condensed in a condenser. In this case, it is possible to set the operating pressure specified in a technically relatively problem-free manner, and the operating temperatures on the other hand still are within a tolerable range where there is no expectation of breakdown of the polycarbonate polyols to a significant degree. Thus, it is unnecessary in the process of the invention to operate the evaporation unit under high vacuum. Moreover, in the apparatus of the invention or the process of the invention, the residence time in the evaporation unit can be kept comparatively short, for example below one minute. In the bottoms vessel of the evaporation unit too, it is possible to set a comparatively short residence time of, for example, 15 minutes or less, preferably 3 minutes or less, such that there is no excessive thermal stress on the polycarbonate polyol at this point either.

However, it is also possible in the context of the process of the invention, for example, to set a residence time of 10 minutes to 2 hours in the bottoms vessel of the evaporation unit. In this case, the bottoms vessel of the evaporation unit can be used as an intermediate buffer for the prepurified product. However, especially in the case of relatively long residence times, there can be further formation of impurities, for example of cyclic alkylene carbonate. However, this further formation takes place upstream of the stripping column in which the final purification is conducted and is comparatively uncritical for this reason. Nevertheless, it is generally preferable in the context of the process of the invention to observe the aforementioned comparatively short residence times in the bottoms vessel of the evaporation unit.

In the second stage, the product prepurified by the evaporation unit is fed to a stripping column in which further purification is effected. Should there be any cooling in the feed in the course of transfer of the prepurified product to the stripping column, it can be heated back to a temperature of, for example, 120 to 180° C., especially to about 160° C., before being fed to the stripping column. The inert gas fed into the bottoms vessel of the stripping column, for example nitrogen, is typically likewise heated to the aforementioned temperature of 120 to 180° C., especially to about 160° C. As an alternative to nitrogen, it is also possible to use carbon dioxide, water vapor or any mixture of the aforementioned fluids as inert gas.

In the case of use of nitrogen as stripping gas, the specific nitrogen demand is preferably in the range of 0.2-0.8 kg of nitrogen, more preferably in the range of 0.3-0.7 kg of nitrogen, based in each case on the mass (in kg) of the product fed to the stripping column.

Because of the fact that the product fed to the stripping column has generally already been freed of a majority of the volatile compounds present, such as cyclic alkylene carbonates, the proportion that evaporates in the stripping column is comparatively small, which leads only to minor cooling of the stripping column in accordance with the enthalpy of evaporation that has to be expended here. Therefore, additional supply of heat to the stripping column is generally not absolutely necessary.

The stripping column can be operated under reduced pressure, for example at a pressure of 50 to 150 mbar, especially at about 80 mbar or else under standard pressure. The inert gas stream laden with volatile compounds, including cyclic alkylene carbonate, after leaving the stripping column, can be fed to one or more coolers in which the volatile compounds are removed. The inert gas can subsequently either be disposed of via the waste air or else compressed and fed to the process again.

In the process of the invention, the residence time in the stripping column too can be kept comparatively short, for example less than 3 minutes, such that damage to the product is very substantially avoided in this second stage too.

In an advantageous configuration of the purifying apparatus of the invention, the gas outlet line of the evaporation unit and/or the gas outlet line of the stripping column each open into a cooling unit in which impurities that have been converted to the gaseous state and removed via the gas outlet line can be condensed, especially cyclic alkylene carbonates. In this way, it is possible to remove the volatile compounds, in which case, for example, the inert gas used in the region of the stripping column can be fed back to the process.

In the case of the purifying apparatus, it may additionally be the case that the feed, the connecting line, the gas inlet line and/or the product line are equipped with a heater. This is particularly advantageous in order to bring the fluid stream conducted through these lines to the desired temperature or to re-establish the defined temperature when there has been cooling below the desired operating temperature because of heat losses in the lines. Moreover, the heating keeps the viscosity of the polymer conveyed through the lines low. In this case, the heaters can be regulated independently in such a way that the fluid conveyed within the corresponding lines is heated to a temperature of 120 to 180° C., especially to a temperature of about 160° C. Appropriately, the heater in the aforementioned lines is arranged in such a way that there can be no further significant cooling after passage through the heated region before the fluid that has been heated to the desired temperature is fed to the next process stage.

In a further embodiment of the purifying apparatus of the invention, there is a three-way valve disposed within the connecting line, from which a recycle line provided if desired with a heater and/or a pump departs and opens into the feed or into the inlet of the evaporation unit. In other words, this creates a circulation line for the evaporator. This is particularly advantageous since it is possible in this way to conduct partial recycling of the prepurified product to the inlet of the evaporation unit, which reduces the concentration content of volatile compounds, such as cyclic alkylene carbonates, at the inlet of the evaporation unit. Multiple passage through the evaporation unit improves the separation performance thereof without having to increase the size of the evaporation unit itself.

Analogously, in the purifying device of the invention, it is also possible for a three-way valve to be disposed in the product line, from which a recycle line provided if desired with a heater and/or a pump departs and opens into the evaporation unit, especially into the bottoms vessel of the evaporation unit. This is particularly advantageous because, in this way, a substream of the product to be purified passes through the stripping column more than once. Moreover, especially on startup of the purifying apparatus of the invention, the product stream that passes through the stripping column can be fed completely through the recycle line of the evaporation unit until there is stabilization of the plant in such a way that the desired maximum values of impurities in the purified product are attained or surpassed. For this purpose, it is especially possible for a sampling point or measurement station to be provided upstream of the three-way valve in the product line, with which the content of impurities to be removed can be determined. The content of cyclic alkylene carbonates can be determined, for example, by means of $^1$H NMR. This method is elucidated in detail in the examples section.

To generate the desired circulation, it is possible for one or more pumps to be provided in the purifying apparatus, for example in the inlet and/or the product line.

The evaporation unit used for the purifying apparatus of the invention may in principle be any unit known to those skilled in the art. Examples of units used for this purpose include natural circulation, forced circulation, falling-film, thin-film or kettle evaporators, of which falling-film and thin-film evaporators are particularly preferred. It may additionally be the case that the feed opens into the inlet of the evaporation unit, and the connecting line and the gas outlet line depart from the bottoms vessel of the evaporation unit.

The evaporation unit may be coupled to a reduced pressure unit, the latter especially being configured such that the evaporation unit can be operated at a pressure of 100 mbar or lower, preferably at 5 to 100 mbar, more preferably at 50 mbar or lower, further preferably at 25 mbar or lower, especially preferably at 10 mbar or lower. This is particularly advantageous since the aforementioned operating pressures, at the aforementioned operating temperatures of, for example, 120 to 180° C., allow good removal of the volatile constituents, while simultaneously preventing excessive thermal stress on the product to be purified.

The stripping column can be operated under standard pressure or else under reduced pressure. In the latter embodiment, for this purpose, the stripping column is appropriately coupled to a reduced pressure unit, the latter particularly being configured such that a pressure of 150 mbar or lower can be established in the top of the stripping column, preferably 100 mbar or lower, more preferably 80 mbar or lower. The operation of the stripping column at these pressures and a temperature of, for example, 120 to 180° C. enables good removal of volatile compounds that are still present, such as cyclic alkylene carbonates, with simultaneous avoidance of excessive thermal stress on the product to be purified at typical operating temperatures of 120 to 180° C.

In the purifying apparatus of the invention, as early as in the first stage, i.e. the evaporation unit, a significant proportion of the volatile compounds can be removed from the product to be purified, such that only a small proportion of volatile compounds has to be removed in the stripping column. This leads to comparatively minor cooling of the stripping column. Frequently, in that case, the heating of the inert gas stream and the heating of the prepurified product fed to the stripping column is sufficient to keep the stripping column at the desired operating temperature. It is nevertheless likewise possible to provide the stripping column with a heating jacket in order thus to enable essentially adiabatic operation. For this purpose, the heating jacket is appropriately coupled via a control unit to one or more temperature sensors which determine the operating temperature of the stripping column at various points and correspondingly regulate the heating output of the heating jacket. At the same time, the heating jacket may also be divided into a plurality of independently regulatable zones, in order to be able to establish the desired temperature over the entire separation length of the stripping column.

The stripping column has advantageously been filled with random packings and/or structure packings and/or equipped with trays. Random packings used are preferably those known as Raschig Super rings.

The present invention further provides a process for purifying polycarbonate polyols with a purifying apparatus comprising an evaporation unit provided with a heater and having an inlet arranged at the top end thereof and having a bottoms vessel, and a stripping column which is connected to the evaporation unit in the downstream direction and has a top and a bottom, especially with a purifying apparatus of the invention, wherein the process comprises the following steps:

a) feeding the polycarbonate polyol to be purified into the inlet of the evaporation unit through a feed that opens into it;

b) in the evaporation unit converting a portion of the impurities to the gas phase and removing the gaseous impurities via a gas outlet line, giving a partly purified polycarbonate polyol in the bottom of the evaporation unit;

c) transferring the partly purified polycarbonate polyol from the bottom of the evaporation unit into the top of the stripping column through a connecting line that opens into it, especially by means of a pump;

d) removing a further portion of the impurities from the partly purified polycarbonate polyol by means of stripping in countercurrent by an inert gas stream introduced into the bottom of the stripping column via a gas inlet line and flowing in the opposite direction to the flow direction of the polycarbonate polyol, with conversion of the impurities to the gas phase and transportation thereof with the inert gas stream;

e) removing the impurities with the inert gas through a gas outlet line which departs from the top of the stripping column;

f) removing the purified polycarbonate polyol via a product line which departs from the bottom of the stripping column.

In an advantageous configuration of the process of the invention, the inert gas used may be nitrogen, carbon dioxide and/or steam. As already explained above, the impurities to be removed in the process of the invention especially includes cyclic alkylene carbonates, preferably cyclic propylene carbonate.

In the case of use of nitrogen as stripping gas, the specific nitrogen demand is preferably in the range of 0.2-0.8 kg of nitrogen, more preferably in the range of 0.3-0.7 kg of nitrogen, based in each case on the mass (in kg) of the partly purified polycarbonate polyol fed to the stripping column. In an advantageous configuration of the process of the invention, the proportion of cyclic alkylene carbonates in the purified polycarbonate polyol is less than 100 ppm. This can be achieved, for example, by way of three-way valves in the connecting line and/or the product line which are used to subject a portion of the prepurified product to the purifying operation again and hence to another purification, until the desired maximum value of 100 ppm of cyclic alkylene carbonates in the polycarbonate polyol is attained.

In the process of the invention, it is further advantageous that phosphoric acid is added before or during the purification to the polycarbonate polyol to be purified, especially in a concentration of 10 to 1000 ppm, based on the polycarbonate polyol to be purified, especially 15 to 500 ppm. For this purpose, for example, a feed for phosphoric acid may be provided in the feed to the evaporation unit. This is particularly advantageous because the addition of phosphoric acid achieves stabilization of the polycarbonate polyol, which reduces reformation of cyclic alkylene carbonates within the purifying apparatus. The reformation can arise from the fact that, in a "back-biting" effect that occurs at elevated temperatures during the purification in the presence of catalyst traces present in the product, for example of a DMC catalyst, individual chain members are detached, particularly at the chain ends of the linear polycarbonate polyol, and these can then in turn react to give cyclic alkylene carbonates.

In a first embodiment, the invention thus relates to a purifying apparatus for polycarbonate polyols, especially for removal of cyclic alkylene carbonates, comprising an evaporation unit (1) provided with a heater (10) and having an inlet (6) arranged at the top end thereof and having a bottoms vessel (11), and a stripping column (2) which is connected to the evaporation unit (1) in the downstream direction and has a top (21) and a bottom (23), wherein a feed (5) for the polycarbonate polyol to be purified opens into the inlet (6) of the evaporation unit (1), and a gas outlet line (12) and a connecting line which opens into the top (21) of the stripping column (2) and has been equipped with a pump (18) depart from the evaporation unit (1), and wherein a gas inlet line (24) for an inert gas opens into the bottom (23) of the stripping column (2), and a product line (27) for the purified polycarbonate polyol departs from the bottom (23) of the stripping column (2) and a gas outlet line (25) from the top (21) of the stripping column (2).

In a third embodiment, the invention relates to a purifying apparatus according to the first embodiment, characterized in that the gas outlet line (12) of the evaporation unit (1) and/or the gas outlet line (25) of the stripping column (2) each open into a cooling unit (13) in which impurities that have been converted to the gaseous state and removed via the gas outlet line (12, 25) can be condensed, especially cyclic alkylene carbonates.

In a further embodiment, the invention relates to a purifying apparatus according to the first or second embodiment, characterized in that the feed (5), the connecting line (3), the gas inlet line (24) and/or the product line (27) has/have been equipped with a heater (9).

In a fourth embodiment, the invention relates to a purifying apparatus according to any of embodiments 1 to 3, characterized in that there is a three-way valve (16) disposed within the connecting line (3), from which a recycle line (17) provided if desired with a heater (9) and/or a pump (18) departs and opens into the feed (5) or into the inlet (6) of the evaporation unit (1).

In a fifth embodiment, the invention relates to a purifying apparatus according to any of embodiments 1 to 4, characterized in that there is a three-way valve (30) disposed within the product line (27), from which a recycle line (31) provided if desired with a heater (9) and/or a pump (18) departs and opens into the evaporation unit (1), especially into the bottom (11) of the evaporation unit (1).

In a sixth embodiment, the invention relates to a purifying apparatus according to any of embodiments 1 to 5, characterized in that a pump (18) is provided in the feed (5) and/or the product line (27).

In a seventh embodiment, the invention relates to a purifying apparatus according to any of embodiments 1 to 6, characterized in that the evaporation unit (1) is configured as a natural circulation, forced circulation, falling film, thin-film or kettle evaporator, preferably as a falling-film or thin-film evaporator, where the feed (5) opens into the inlet (6) of the evaporation unit (1) and the connecting line (3) and the gas outlet line (12) depart from the bottom (11) of the evaporation unit (1).

In an eighth embodiment, the invention relates to a purifying apparatus according to any of embodiments 1 to 7, characterized in that the evaporation unit (1) is coupled to a reduced pressure unit, the latter especially being configured such that the evaporation unit (1) can be operated at a pressure of 100 mbar or lower, preferably at 5 to 100 mbar, preferably at 50 mbar or lower, further preferably at 25 mbar or lower, more preferably at 10 mbar or lower.

In a ninth embodiment, the invention relates to a purifying apparatus according to any of embodiments 1 to 8, characterized in that the stripping column (2) is coupled to a reduced pressure unit, the latter especially being configured such that, in the top (21) of the stripping column (2), a pressure of 150 mbar or lower can be established, preferably 100 mbar or lower, more preferably 80 mbar or lower.

In a tenth embodiment, the invention relates to a purifying apparatus according to any of embodiments 1 to 9, characterized in that the stripping column (2) is provided with a heating jacket (22) which enables essentially adiabatic operation of the stripping column (2).

In an eleventh embodiment, the invention relates to a purifying apparatus according to any of embodiments 1 to 10, characterized in that the stripping column (2) is filled with random packings and/or structure packings and/or equipped with trays, the random packings used especially being Raschig Super rings.

In a twelfth embodiment, the invention relates to a process for purifying polycarbonate polyols with a purifying apparatus comprising an evaporation unit (1) provided with a heater (10) and having an inlet (6) arranged at the top end thereof and having a bottoms vessel (11), and a stripping column (2) which is connected to the evaporation unit (1) in the downstream direction and has a top (21) and a bottom (23), especially with a purifying apparatus as claimed in any of claims 1 to 11, wherein the process comprises the following steps:
- a) feeding the polycarbonate polyol to be purified into the inlet (6) of the evaporation unit (1) through a feed (5) that opens into it;
- b) in the evaporation unit (1) converting a portion of the impurities to the gas phase and removing the gaseous impurities via a gas outlet line (12), giving a partly purified polycarbonate polyol in the bottom (11) of the evaporation unit (1);
- c) transferring the partly purified polycarbonate polyol from the bottom (11) of the evaporation unit (1) into the top (21) of the stripping column (2) through a connecting line (3) that opens into it, especially by means of a pump (18);
- d) removing a further portion of the impurities from the partly purified polycarbonate polyol by means of stripping in countercurrent by an inert gas stream introduced into the bottom (23) of the stripping column (2) via a gas inlet line (24) and flowing in the opposite direction to the flow direction of the polycarbonate polyol, with conversion of the impurities to the gas phase and transportation thereof with the inert gas stream;
- e) removing the impurities with the inert gas through a gas outlet line (25) which departs from the top (21) of the stripping column (2);
- f) removing the purified polycarbonate polyol via a product line (27) which departs from the bottom (23) of the stripping column (2).

In a thirteenth embodiment, the invention relates to a process according to the twelfth embodiment, characterized in that the inert gas used is nitrogen, carbon dioxide and/or steam.

In a fourteenth embodiment, the invention relates to a process according to either of embodiments 12 and 13, characterized in that the impurities to be removed comprise cyclic alkylene carbonates, especially cyclic propylene carbonate, where the proportion of cyclic alkylene carbonates in the purified polycarbonate polyol is preferably less than 100 ppm.

In a fifteenth embodiment, the invention relates to a process according to any of embodiments 12 to 14, characterized in that phosphoric acid is added to the polycarbonate polyol to be purified before or during the purification, especially in a concentration of 10 to 1000 ppm, based on the polycarbonate polyol to be purified, especially 15 to 500 ppm.

The present invention is elucidated in detail hereinafter with reference to a FIGURE and working examples.

The sole FIGURE, the FIGURE, shows a schematic construction of a purifying apparatus of the invention.

The FIGURE depicts an embodiment of a purifying apparatus of the invention for polycarbonate polyols.

FIG. 1 depicts an embodiment of a purifying apparatus of the invention for polycarbonate polyols. The purifying apparatus serves here to separate cyclic alkylene carbonates from polycarbonate polyols, in the present case polyether carbonate polyols, which have been produced by means of DMC catalysis. The purifying apparatus consists essentially of an evaporation unit 1, configured in the present case as a falling-film evaporator, and a stripping column 2 arranged downstream of the evaporation unit 1. The evaporation unit 1 and the stripping column 2 are connected to one another via a connecting line 3. The purifying apparatus is supplied with the polyether carbonate polyol to be purified from a heated vat 4 via a feed 5 which opens into an inlet 6 of the evaporation unit 1. The vat 4 has additionally been equipped with ventilation 7. Barrier valves 8 and a heater 9 have additionally been provided in the feed 5.

The evaporation unit 1 has a heater 10 configured as a heating jacket with an inlet 10a and an outlet 10b for a heating fluid. The evaporation unit 1 has, at its lower end, a bottoms vessel 11, with provision, above the bottoms vessel 11, of a gas outlet line 12 for gaseous cyclic propylene carbonate in which two coolers 13 arranged in sequence are provided, in which the cyclic propylene carbonate is condensed, the liquid outlet for the condensed cyclic propylene carbonate opening into a collecting vessel 14. Uncondensable constituents are removed via a waste air system 15 arranged on the outflow side of the coolers 13.

Below the bottoms vessel 11, the connecting line 3 is attached, in which there is positioned a three-way valve 16, by means of which a portion of the prepurified product can be recycled via a recycle line 17 to the inlet 6 of the evaporation unit 1. For forced conveying of the prepurified product, pumps 18 are provided in the connecting line 3 and in the recycle line 17. In addition, the connecting line 3 has a sampling point 19 at which the content of impurities in the product stream can be determined. The connecting line 3 is further equipped with a heater 9 and a heat exchanger 20, with the aid of which the polyether carbonate polyol prepurified in the evaporation unit 1 can be kept at the desired temperature or brought to this temperature.

The stripping column 2 as a top 21, into which the connecting line 3 opens. The stripping column 2 is configured as a DN80 glass column with length 8 m, filled with #0.3 Raschig Super rings as random packings and provided with separately regulatable heating jackets 22 which, with the aid of temperature sensors 22a, enable essentially adiabatic operation of the stripping column 2 via a temperature control system coupled thereto and not shown in the present case. The effective separation length of the glass column of 8 m is divided into a subregion of length 6 m in the upper region and a subregion of length 2 m in the lower region, with a sampling point 19 provided between the subregions.

The stripping column 2 also has a bottoms vessel 23, above which a gas inlet line 24 for inert gas is attached, through which inert gas heatable by means of a heat exchanger 20, nitrogen in the present case, can be fed into the stripping column 2, such that it can be operated by the countercurrent principle. At the top 21 of the stripping column 2, a gas outlet line 25 is connected, through which inert gas laden with volatile impurities, such as cyclic propylene carbonate, can be conducted through condensers 13 arranged downstream in sequence, in which the impurities can be condensed out and can be collected in a container 14. On the downstream side of the coolers 13 is arranged a cold trap 26 for as yet uncondensed gaseous impurities, to which a waste air system 15 is connected.

From the bottoms vessel 23 of the stripping column 2, a product line 27 departs, through which the purified polyethercarbonate polyol can be transferred with the aid of a pump 18 into a product vessel 29 provided with a ventilation system 28. The product line 27 is additionally equipped with a heater. Also arranged in the product line 27 is a three-way valve 30, from which a recycle line 31 departs and opens into the bottoms vessel 11 of the evaporation unit 1.

A crude product purified with the apparatus of the invention was prepared in a continuously operated 60 L pressure reactor with gas metering unit and product discharge tube, which had been initially charged with 4.7 kg of propylene carbonate (cPC) and 200 ppm of activated DMC catalyst (prepared according to WO 01/80994 A1, example 6 therein). At 10° C. and 74 bar (absolute), while stirring (15 Hz), the following components were metered in at the metering rates specified:
propylene oxide at 6.41 kg/h
carbon dioxide at 2.6 kg/h
mixture of glycerol/propylene glycol (85% by weight/ 15% by weight) containing 0.69% by weight of DMC catalyst (unactivated) and 170 ppm (based on the starter mixture) of $H_3PO_4$ at 0.26 kg/h.

The reaction mixture was withdrawn from the reactor continuously through the product discharge tube, such that the reaction volume of 27.4 L was kept constant. To complete the reaction, the reaction mixture was transferred into a postreactor (tubular reactor with reaction volume 10.4 L) heated to 107° C. The polyether carbonate polyol (crude product) obtained contains 8.4% by weight of cyclic propylene carbonate (cPC).

The content of cyclic carbonate (which was formed as a by-product), in the context of the present invention, is generally determined via the NMR resonance at 4.5 ppm, carbonate resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, any octane-1,8-diol incorporated has starter molecule with a resonance at 1.6 to 1.52 ppm.

The mole fraction of carbonate incorporated in the polymer in the reaction mixture is calculated by formula (II), using the following abbreviations:

$A(4.5)$=area of the residence at 4.5 ppm for cyclic carbonate (corresponding to one hydrogen atom)
$A(5.1\text{-}4.8)$=area of the residence at 5.1-4.8 ppm for polyether carbonate polyol and one hydrogen atom for cyclic carbonate.
$A(2.4)$=area of the resonance at 2.4 ppm for free, unreacted PO
$A(1.2\text{-}1.0)$=area of the resonance at 1.2-1.0 ppm for polyether polyol
$A(1.6\text{-}1.52)$=area of the resonance at 1.6 to 1.52 ppm for octane-1,8-diol (starter)

Taking account of the relative intensities, according to the following formula (II), a conversion was made to mol % for the polymer-bound carbonate ("linear carbonate" LC) in the reaction mixture:

$$LC = \frac{A(5.1-4.8) - A(4.5)}{A(5.1-4.8) + A(2.4) + 0.33*A(1.2-1.0) + 0.25*A(1.6-1.52)} * 100 \qquad \text{(II)}$$

The proportion by weight (in % by weight) of polymer-bound carbonate (LC') in the reaction mixture was calculated by formula (III)

$$LC' = \frac{[A(5.1-4.8) - A(4.5)]*102}{D} *100\% \qquad \text{(III)}$$

where the value of D ("denominator" D) is calculated by formula (IV):

$$D=[A(5.1\text{-}4.8)-A(4.5)]*102+A(4.5)*102+A(2.4)*58+0.33*A(1.2\text{-}1.0)*58+0.25*A(1.6\text{-}1.52)*146 \qquad \text{(IV)}$$

The factor of 102 results from the sum total of the molar masses of $CO_2$ (molar mass 44 g/mol) and of propylene oxide (molar mass 58 g/mol); the factor of 58 results from the molar mass of propylene oxide and the factor of 146 results from the molar mass of any octane-1,8-diol starter used.

The proportion by weight (in % by weight) of cyclic carbonate (CC') in the reaction mixture was calculated by formula (V)

$$CC' = \frac{A(4.5)*102}{D} *100\% \qquad \text{(V)}$$

where the value of D is calculated by formula (IV).

In the operation of the purifying apparatus shown in the FIGURE, the crude product produced as above, i.e. the polyether carbonate polyol contaminated with preparation-related impurities, optionally after additional different amounts of phosphoric acid (see table 1) for stabilization, is pumped from the vat 4 through the heated feed 5 into the inlet 6 of the evaporation unit 1. To reduce the viscosity of the crude product, it is heated to 50° C. directly in the vat 4 and conveyed with outputs of 2.1 kg/h to 5.5 kg/h (see table 1) to the evaporation unit 1. The falling-film evaporator is configured as a glass apparatus with an area of 0.5 m² and is operated at a pressure of 10 mbar by means of a reduced pressure unit (not shown).

In the evaporation unit 1, during the passage of the crude product, a portion of the volatile impurities, especially a portion of the cyclic propylene carbonate which is removed via the gas outlet line 12, is condensed by means of the coolers 13 and collected in the collecting vessel 14. In this case, the first cooler 13 to be passed through is operated at a coolant temperature of 10° C. and the cooler 13 which is downstream in sequential terms at a coolant temperature of −20° C.

The prepurified product collects in the bottoms vessel 11 of the evaporation unit 1, whence it is conveyed, in a proportion regulatable by means of the three-way valve 16, through the connecting line 3 of the stripping column 2, the other portion being conveyed through the recycle line 17 to the inlet 6 of the evaporation unit 1. The use of the recycle line 17 results in a portion of the already prepurified product being fed once again to the purification by means of the evaporation unit 1, which increases the purification performance thereof. The prepurified product, at the end of the downpipe of the evaporation unit 1, has a temperature of about 160° C. In the evaporation unit 1, in the case of the present arrangement, about 70% by weight of the low boilers present in the crude product are removed.

The prepurified product withdrawn from the circulation via the connecting line 3 is fed to the top 21 of the stripping column 2. The connecting line 3 is heated here with the aid of the heater 9 to about 100° C., in order to prevent a significant increase in viscosity resulting from cooling of the product. Immediately upstream of the application to the top 21 of the stripping column 2, the prepurified product is heated to about 160° C. by means of the heat exchanger 20. The prepurified product passes through the stripping column 2 under gravity, the stripping column 2 being operated essentially adiabatically with the aid of the heating jackets 22. This purpose is served by the temperature sensors 22a coupled to the heating jackets 22.

The stripping column 2 is operated by the countercurrent principle with a nitrogen flow heated to 160° C. and fed in through the gas inlet line 24. In the nitrogen stream that flows in the direction of the top 21, the volatile constituents accumulate and are fed via the gas outlet line 25 to the coolers 13 in which the volatile compounds, especially the cyclic propylene carbonate, are condensed and collected in the collecting vessel 14. In this case, the cooler 13 to be passed through first is operated at a temperature of 10° C. and the downstream cooler at a temperature of −20° C. At the sampling point 19 arranged in the feed to the cold trap 26, the inert gas stream can be examined for any impurities, before it is removed from the circuit via the waste air system 15 or else fed back to the circuit via a compression system.

The purified product collects in the bottoms vessel 23 of the stripping column 2, having passed the stripping column 2, and is transferred via the product line 27 with the aid of the pump 18 into the product vessel 29. By means of the three-way valve 30 provided in the product line 27, a portion of the product stream can be branched off and transferred via the recycle line 31 back into the bottoms vessel 11 of the evaporation unit 1. During the startup period of the purifying apparatus, the entire product stream discharged via the product line 27 in the bottoms vessel 23 is fed via the recycle line 31 back to the bottoms vessel 11 of the evaporation unit 1 until the desired product purity has been attained. This is verified by means of the sampling point 19 provided in the product line 27.

The residence time of the prepurified product in the bottoms vessel 11 of the evaporation unit 1 is about 10 minutes, and that in the bottoms vessel 3 of the stripping column 2 about 6 minutes.

Experiments were conducted in the system described, wherein the evaporation unit 1, the connecting line 3 to the stripping column 2 and the inert gas stream (nitrogen) were set to 160° C. The evaporation unit 1 ran at an operating pressure of 10 mbar, the stripping column 2 at 80 mbar. Table 1 summarizes the relevant process parameters and the final concentrations of cyclic propylene carbonate cPC attained in the purified end product.

TABLE 1

| Example | Addition of phosphoric acid | Throughput (feed to the evaporation unit 1) | Mass flow rate of stripping gas (nitrogen) into stripping column 2 | cPC concentration in the end product |
|---|---|---|---|---|
| 1 | — | 5.5 kg/h | 2.275 kg/h | 55 ppm |
| 2 | 61 ppm | 4.7 kg/h | 2.275 kg/h | 17 ppm |
| 3 | 100 ppm | 2.1 kg/h | 2.275 kg/h | 17 ppm |
| 4 | 100 ppm | 4.2 kg/h | 2.275 kg/h | 20 ppm |
| 5 | 100 ppm | 5.2 kg/h | 2.275 kg/h | 24 ppm |

The experiments demonstrate that the required maximum value of 100 ppm of cPC in the end product can be reliably attained by the process of the invention. Addition of small amounts of phosphoric acid (examples 2-5) brings about stabilization of the polyether carbonate polyol, such that it is possible in this way to achieve much lower residual concentrations of cPC in the end product than without addition of phosphoric acid (example 1).

LIST OF REFERENCE NUMERALS (1) evaporation unit
(2) stripping column
(3) connecting line
(4) vat
(5) feed
(6) inlet
(7) ventilation system
(8) barrier valve
(9) heater
(10) heater
(10a) inlet
(10b) outlet
(11) bottoms vessel
(12) gas outlet line
(13) cooler
(14) collecting vessel
(15) waste air system
(16) three-way valve
(17) recycle line
(18) pump
(19) sampling point
(20) heat exchanger
(21) top
(22) heating jacket
(22a) temperature sensor
(23) bottoms vessel
(24) gas inlet line
(25) gas outlet line
(26) cold trap
(27) product line
(28) ventilation system
(29) product vessel
(30) three-way valve
(31) recycle line

The invention claimed is:

1. A process for purifying polycarbonate polyols with a purifying apparatus, the purifying apparatus comprising:
   (1) an evaporation unit comprising:
      a heater;
      an inlet arranged at the top end of the evaporation unit; and
      a bottoms vessel; and
   (2) a stripping column which is connected to the evaporation unit in the downstream direction, wherein the stripping column comprises a top and a bottom,
   wherein a feed for a polycarbonate polyol comprising impurities is delivered into the inlet of the evaporation unit, and wherein a first gas outlet line and a connecting line which opens into the top of the stripping column and has been equipped with a pump depart from the evaporation unit,
   and wherein a gas inlet line for an inert gas opens into the bottom of the stripping column, wherein a product line for the purified polycarbonate polyol departs from the bottom of the stripping column, and wherein a second gas outlet line departs from the top of the stripping column,
   wherein the process comprises:
      (i) feeding the polycarbonate polyol into the inlet of the the evaporation unit through a feed that is delivered into the inlet of the evaporation unit;
      (ii) converting, within the evaporation unit, a first portion of the impurities to gaseous impurities and removing the gaseous impurities via the first gas outlet line, thereby producing a partly purified polycarbonate polyol at the bottom of the evaporation unit;
      (iii) transferring the partly purified polycarbonate polyol from the bottom of the evaporation unit into the top of the stripping column through a connecting line that opens into the stripping column;

(iv) removing a second portion of impurities from the partly purified polycarbonate polyol by stripping in countercurrent by an inert gas stream introduced into the bottom of the stripping column via a gas inlet line and flowing in the opposite direction to the flow direction of the partly purified polycarbonate polyol, thereby producing a purified polycarbonate polyol, wherein the second portion of impurities are converted into second gaseous impurities and are transported with the inert gas stream;

(v) removing the second gaseous impurities with the inert gas through the second gas outlet line which departs from the top of the stripping column; and (vi) removing the purified polycarbonate polyol via a product line which departs from the bottom of the stripping column, wherein phosphoric acid is added to the polycarbonate polyol to be purified before or during the converting in the step (ii), in a concentration of 10 to 1000 ppm, based on the polycarbonate polyol to be purified.

2. The process as claimed in claim 1, wherein the inert gas is selected from the group consisting of nitrogen, carbon dioxide, steam, and combinations of any thereof.

3. The process as claimed in claim 1, wherein the impurities comprise cyclic alkylene carbonates, and wherein the proportion of cyclic alkylene carbonates in the purified polycarbonate polyol is less than 100 ppm.

4. The process as claimed in claim 1, wherein a pump is configured to transfer the partly purified polycarbonate polyol from the bottom of the evaporation unit into the top of the stripping column.

5. The process as claimed in 1, wherein phosphoric acid is added to the polycarbonate polyol to be purified before or during the converting in the step (ii), in a concentration of 15 to 500 ppm, based on the polycarbonate polyol to be purified.

6. The process as claimed in claim 1, wherein the impurities comprise cyclic propylene carbonate.

* * * * *